July 5, 1966  M. TEN BOSCH ETAL  3,258,958
THRUSTMETER SYSTEM
Filed Feb. 21, 1956  3 Sheets-Sheet 2

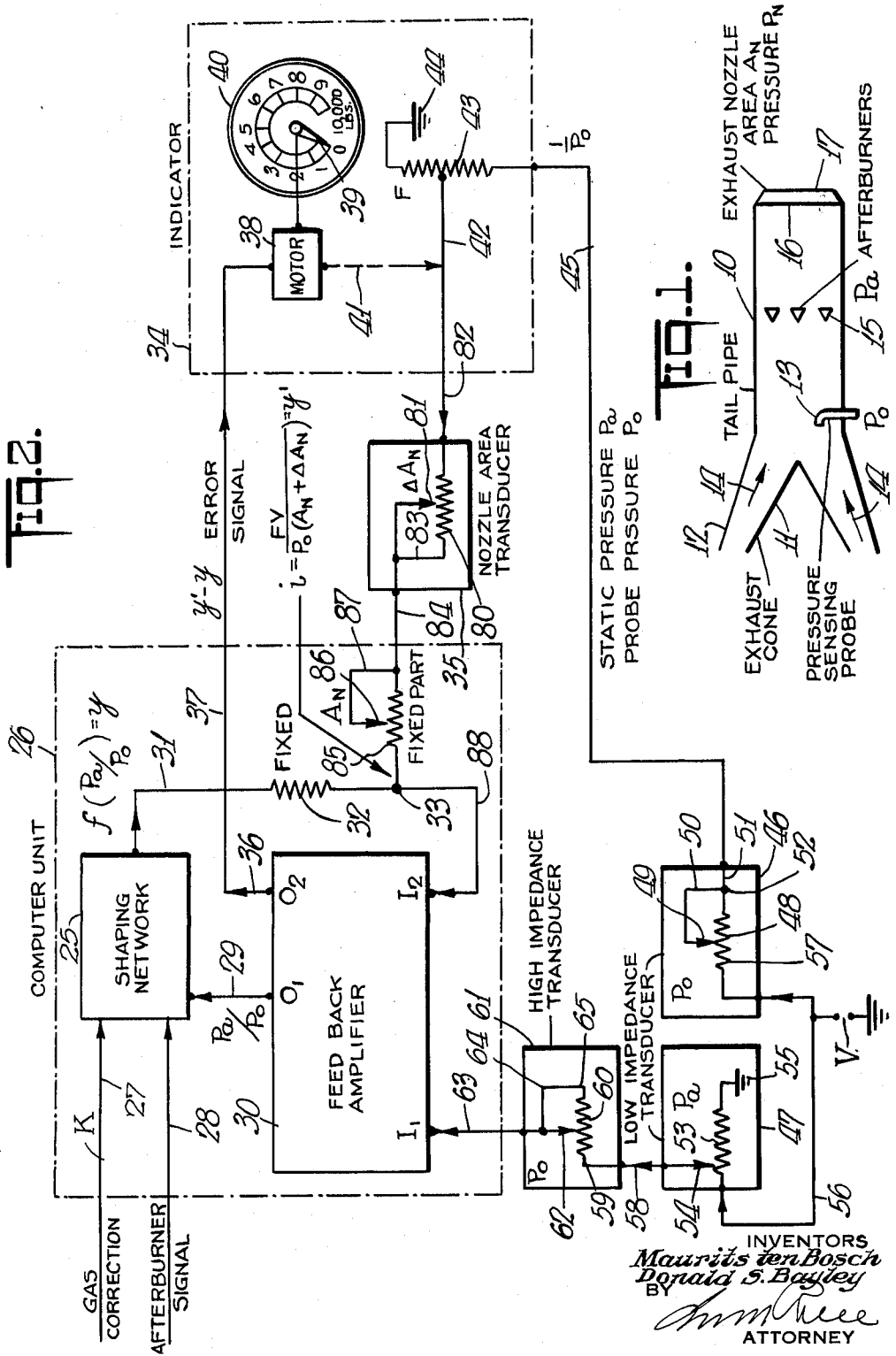

INVENTOR
MAURITS TEN BOSCH
DONALD S. BAYLEY
BY
ATTORNEY

INVENTORS
Maurits ten Bosch
Donald Bayley
BY
ATTORNEY

United States Patent Office 3,258,958
Patented July 5, 1966

3,258,958
THRUSTMETER SYSTEM
Maurits Ten Bosch, White Plains, and Donald S. Bayley, Bedford, N.Y., assignors to M. Ten Bosch, Inc., Pleasantville, N.Y., a corporation of New York
Filed Feb. 21, 1956, Ser. No. 566,878
2 Claims. (Cl. 73—116)

The present invention relates to a thrustmeter system and it particularly relates to a thrustmeter system which may be utilized with jet aircraft.

It is among the objects of the present invention to provide a jet engine thrustmeter system which will present to the pilot a direct reading of the gross thrust at the nozzle of the jet engine and which will be capable of determining the gross thrust over the full operating range of the jet engine and under all ambient conditions.

Another object is to provide a novel jet engine thrustmeter system which will enable ready adjustment of jet engines for maximum thrust upon take-off, and which will thereafter give such indication as will enable ready adjustment of the engine throughout operating conditions for controlling fuel consumption and the thrust as may be required.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory according to one embodiment of the present invention to provide in association with the tail pipe of the jet or turbo-jet engine a pressure sensing probe which together with an indicator of static pressure will enable a ready indication of the thrust, which in turn may be readily correlated with the nozzle area and the fuel consumption.

Desirably the system should present to the pilot a direct reading of the gross thrust at the nozzle of the jet engine, and the jet engine thrustmeter system may be essentially connected to the static pressure line of the aircraft to give an indication of static pressure, and to the jet engine sensing probe which in turn will measure the total tail pressure forward of the after burners which may be provided in the tail pipe arrangement.

The gross thrust is essentially determined by correlation of the differential pressure thrust at the nozzle opening and the momentum per unit time of the gas flowing out of the nozzle.

The gross thrust designated by the symbol F is composed of two parts, indicated by the symbols $F_p$ and $F_m$. The first part indicated by the symbol $F_p$ may be calculated from the equivalent area of the nozzle, the static pressure at the nozzle opening, and the static pressure of the atmosphere and may be written as follows in equation form:

$$F_p = A_N (P_N - P_a)$$

where $A_N$ = equivalent area of nozzle
$P_N$ = static pressure at nozzle opening
$P_a$ = static pressure of atmosphere $K$ = ratio $\dfrac{C_p \text{ (specific heat at constant pressure)}}{C_v \text{ (specific heat at constant volume)}}$ The second part of the gross thrust is derived from the momentum per unit time of the gas flowing out of the nozzle. It may be determined from the velocity of the gas relative to the nozzle, the mass of gas leaving the nozzle per unit time, the density of the gas at the nozzle opening, and the equivalent area of the nozzle corrected for friction.

The following equation may be used to express this relationship:

$$F_M = u_N \frac{dm}{dt} = A'_N \rho_N u^2_N$$

where $u_N$ = velocity of gas relative to nozzle
$dm/dt = M$ = mass of gas leaving nozzle per unit time
$\rho_N$ = density of gass at nozzle opening
$A'_N$ = equivalent area of nozzle corrected for friction When $u_N$ is less than $a$, which represents the velocity of sound, $$P_N = P_a$$

The gross thrust $F$ then may be expressed by the following equation:

$$F = F_m = P_o A'_N \frac{2K}{K-1} X \left[1 - X\frac{K-1}{K}\right] \quad u_N < a$$

(below velocity of sound)

where $X$ = the pressure ratio $P_a/P_o$

In the above equations N stands for the nozzle and the terms on the right side of the above equation are multiplied by one another.

X in this fourth equation represents the pressure ratio and it may be substituted by $P_a/P_o$.

In this equation $u_N$ is the average gas velocity. $A_N$ is the equivalent area of the nozzle assuming uniform flow over the area of the nozzle.

The above equation may also be rewritten so that it will appear as follows:

$$F = F_m = P_o \cdot A'_N \cdot \frac{2K}{K-1} \cdot \frac{P_a}{P_o} \left(1 - \frac{P_a}{P_o} \cdot \frac{K-1}{K}\right) u_N < a$$

in which equation $P_a/P_o$ has been substituted for X.

When $u_N$ is above the velocity of sound, the gross thrust F may be expressed as follows:

$$F = A_N P_o (C - X) \quad u_N > a$$

where $$C = \left(\frac{2}{K+1}\right) \frac{K}{K-1} \left(1 + K \frac{A'_n}{A_n}\right)$$

(above velocity of sound)

The above equations indicate that the thrust can be calculated by measurement of two pressures, namely: the stagnation pressure $P_o$ at the engine or in the tail pipe, and the free air static pressure $P_a$.

It is thus apparent that one instrument can be used for calculation of the thrust under all conditions of engine operation.

A simple form of the equation would be:

$$y = \frac{F}{A_N P_o} = f(X)$$

where $y$ = ratio of gross thrust per unit nozzle area to the stagnation pressure
$F$ = gross thrust
$A_n$ = nozzle area
$P_o$ = stagnation pressure at the probe
$X = P_a/P_o$
$P_a$ = static pressure of atmosphere In the preferred instrumentation, because of the remote location of the jet engine pressure probe, it is desirable in one form of the invention to have 3 incident pressure-transducers, 2 for determining the stagnation pressure and 1 for determining the static pressure of the atmosphere and the ratio X, which represents the quotient of the atmosphere over the stagnation pressure can then be determined electrically with an amplifier network.

Referring to FIG. 1 there is shown a tail pipe 10 of a schematic turbo-jet engine, with an exhaust cone 11 and an exhaust funnel 12.

The sensing probe 13 is placed to project into the stream of gases indicated by the arrows 14. The after burners 15 are located after the sensing probe 13. The exhaust nozzle 16 has a variable outlet area indicated at 17.

Referring to the schematic layout of the thrustmeter system as shown in FIG. 2, the shaping network 25 in the computer casing or housing 26 rceives information at 27 as to the gas correction which may consist of a manual screw driver adjustment, and it also receives information from the after burner signal at 28.

The shaping network is a conventional device shown upon FIG. 2a with a result indicated in FIG. 2b.

In the shaping network there will be diodes at 250 and 251 which are positioned on electrical connections 252 and 253 between the opposite resistances 254 and 255 and 256 and 257.

The resistances 254 and 255 are connected to the line 27 and lead to a ground 258.

The resistances 256 and 257 are connected to the line 29 and the inturned lead to the resistance 259 to the line 31.

Normally the curve would be a straight line as indicated at 260 in FIG. 2b.

However when the voltages exceeds a certain value as indicated at 261 the first diode 250 will be effective to decrease the slope so that the curve will take the slope as indicated at 262.

When still an additional voltage is exceeded as indicated at 263, the slope will further decrease as indicated at 264 so that the initial part of the curve 265 together with the portions 262 and 264 will approximate a curve as indicated.

The shaping network is a conventional device which forms no part of the present invention and by means of it the curve of the output as a function of the input can be approximated by a series of straight lines 265, 262 and 264.

A third source of information will be at 29 from the feedback amplifier 30. This information fed into the shaping network in turn will pass by the connection 31 to the fixed resistance 32 where it will join at 33 information supplied from the indicator 34 and the nozzle area potentiometer 35.

The feedback amplifier as indicated at 30 is a conventional arrangement and forms no part of the present invention.

It however consists of two amplifier units, FIG. 2c, 280 and 281 in turn respectively supplied by the connections 63 and 88 with the amplifier 280 supplying a signal to the line 29 and the amplifier 281 supplying an error signal to the line 36.

The error signal is supplied by the conduits or connections 36 and 37 to the motor 38 in the indicator which drives the pointer 39 on the thrustmeter indicator dial 40.

This dial is graduated from 0 to 10,000 lbs. thrust.

From the motor there will be a mechanical connection at 41 to the adjustable contact 42 to the adjustable resistance 43 provided with the ground 44. The shaft 42a will turn proportionately to the adjustable contact 42.

This resistance 43 is also provided with a connection 45 from the low impedance probe pressure transducer 46 and the low impedance static pressure transducer 47. The transducer 46 is provided with a resistance coil 48 and the movable contact 49 which is driven by a bellows actuated from the probe pressure.

In this amplifier network the desired function $y=f(X)$ can then be determined by a shaping network with the diodes and be multiplied by the static pressure and the equivalent area of the nozzle in a servo operated indicator which drives a feedback potentiometer. The diodes serve to lower the slope of the curve when certain voltages are exceeded so as to give a series of oblique straight lines of decreasing slope approximating the curve which should be obtained.

The feedback amplifier should desirably serve as a double adding amplifier each section of which gives an output voltage proportional to the sum of the currents fed to its input. The feedback action holds the potential at the input essentially at zero with reference to the input signal system. The feedback amplifier has two amplifiers therein, one of which receives a signal giving the ratio of static to probe pressure and receiving it from a high impedance transducer and in turn transmitting it to the shaping network while the second amplifier receives a feedback signal from the shaping network giving a function of the ratio of static pressure to probe pressure which is combined with a signal from potentiometer in the indicator which is driven to null position by the motor of the indicator which is transmitted to the second amplifier which in turn transmits any error signal to the motor until it is driven to null position.

Such a feedback amplifier can be provided with one section which will have an output proportional to the pressure ratio X. This is converted to the function $y=f(X)$ by the shaping network and fed to the input of the second amplifier where it is compared with the function $$y' = \frac{F}{A_N P_o}$$

The output of the second section is the error signal $y-y'$ that will actuate the servo device in the indicator.

In the preferred form of the invention the overall weight of the system may be less than four lbs. with subminiature components being used in the computer. With the use of transistors the computer could be located in the indicator and a further saving in weight obtained.

The system will operate from the 115 volt, 380–420 cycles, single phase A.C. line and will consume less than 30 watts of power.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a schematic side sectional view of a typical tail pipe of a turbo-jet engine.

FIG. 2 is a schematic layout of one form of preferred jet engine thrust meter system according to the present invention.

Figure 2A:
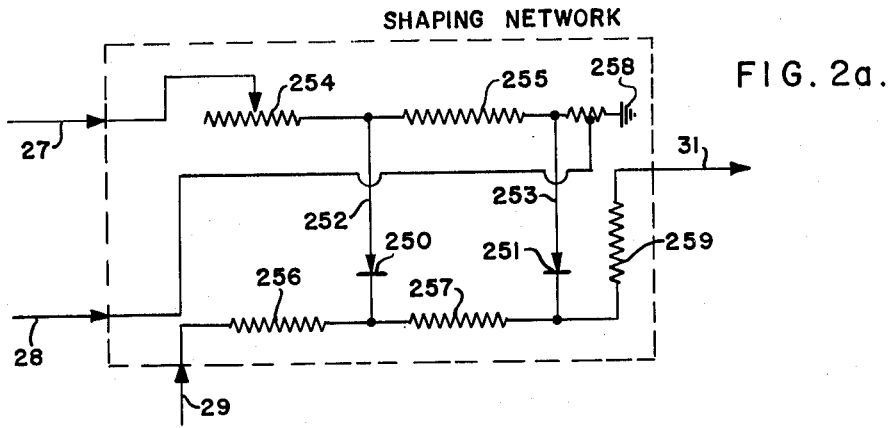
FIG. 2a is a diagrammatic layout of a typical shaping network as may be utilized in FIG. 2.

The adjustable contact 49 has a connection 50 to the line 51 at the point 52.

In the transducer 47 there will be an adjustable resistance 53 having the adjustable contact 54 which is driven by means of a bellows actuated by the static pressure.

The resistance 53 has a ground 55 and a connection 56 to one end 57 of the resistance 48 in the transducer 46.

The contact 54 is also connected by the connection 58 to one end 59 of the adjustable resistance 60 in the high impedance probe pressure transducer 61. The movable contact 62 is also bellows driven by means of the probe pressure.

There are two connections from the movable contact 62, one at 63 being to the feedback amplifier and the other at 64 being to the end 65 of the resistance 60.

The potentiometer 35 has an adjustable resistance 80 having the movable contact 81 which is connected to be adjusted by the change in nozzle area of the exhaust nozzle 17.

From one end of the coil 80 there is a connection 82 to the pointer 42 of the resistance 43 in the indicator. There will also be a connection 83 from the contact 81 to the other end of the coil or resistance 80 and at 84 to the resistance 85.

The resistance 85 has a manually adjustable movable contact 86 on the line 87 which may consist of a screw driver adjustment to the value of the exhaust nozzle area.

In operation the information supplied at 27 may be a fixed screw driver adjustment while that through the connection 28 will be automatic from the after burner signal.

On the other hand, the adjustable contacts 49, 54 and 62 of the transducers 46, 47 and 61 will all be bellows driven with the adjustable contact 49 and 62 being actuated to give information as to the probe pressure, and the adjustable contact 54 being bellows actuated to give information as to the static pressure.

The adjustment 86 of the resistance 85 will be manually adjusted to give a reading corresponding to the normal exhaust nozzle outlet area, while the adjustable contact 81 will be adjusted by change in the exhaust nozzle area.

It is thus apparent from the diagrammatic layout shown in FIG. 2 that the error signal arising from the feedback amplifier 30 will actuate the motor 38 which drives both the indicator point 39 as well as the adjustable contact 42 to reduce the error signal to zero through the connections from the junction 33 and the line 88 back to the feedback amplifier 30.

The signals $y'$ and $y$ will cancel each other out when they are equal and opposite and when the motor 38 stands still.

The difference between $y$ and $y'$ when not zero is an error signal which is transmitted through the line 37 to drive the motor 38 and the motor 38 will move as long as there is a difference between the signals $y'$ and $y$.

The displacement on the potentiometer 43 will represent the thrust and the brush or contact at the right end of the line 42 will be moved on the potentiometer until the difference between $y'$ and $y$ is reduced to zero.

This movement will also move the pointer 39 to give the thrust on the dial 40.

At the same time there is a feedback through the line 82 from right to left to the computer unit 26.

The motor will always be rotated until the error signal is zero.

The entire arrangement shown in the schematic layout of FIG. 2 is electrical and various parts thereof may be replaced by mechanical adjustments.

Figure 3:
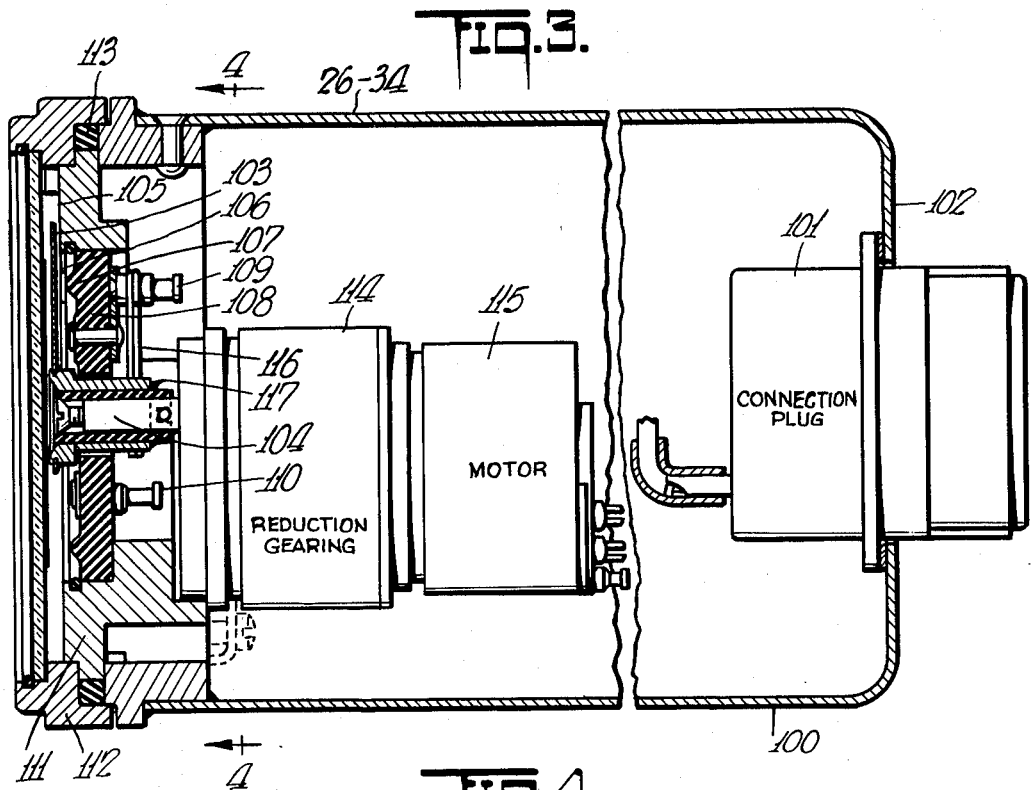
FIG. 3 is a transverse longitudinal side sectional view showing a layout of a jet engine thrustmeter indicator.
Figure 4:
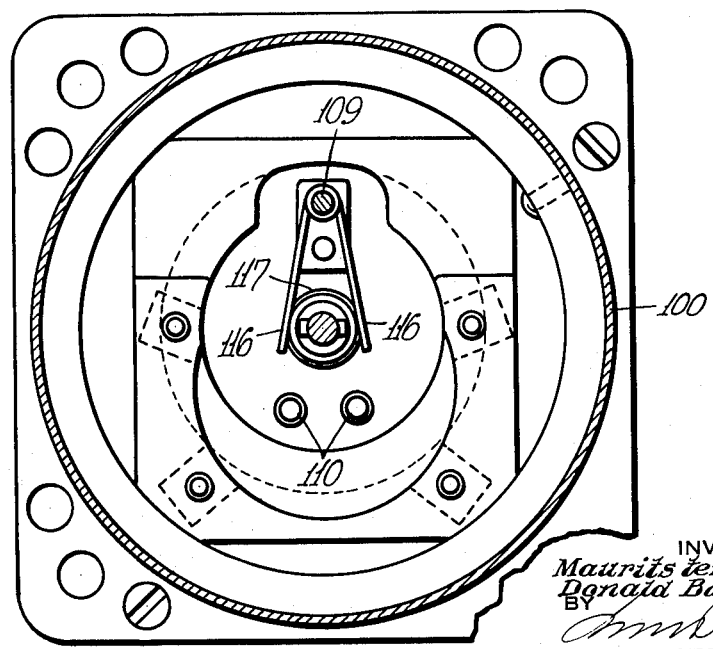
FIG. 4 is a transverse sectional view upon the line 4—4 of FIG. 3.

In FIGS. 3 and 4 there is shown a typical meter setup in which there may be a meter housing 100 having the connection plug 101 at the end 102, and having the movable pointer and slider 103 which is driven upon a shaft 104 as against the scale or dial face 105.

The indicator arm will carry the contact element 106 which will act as a wiper upon the projection portion 107 on the potentiometer 108. The potentiometer 108 is provided with the electrical connection 109 and 110.

The front molded plastic unit 111 may be held in place by the annular cup 112 and the rubber ring 113.

The shaft 104 is driven through the gear box 114 from the motor 115.

Referring to the sectional view of FIG. 4 there is shown the potentiometer connections 109 and 110. There are also shown the brush connections 116 which ride upon the commutator or contactor sleeve 117.

The motor unit 114–115 may be a geared servo-motor.

It is thus apparent that the applicant has provided a simple, compact unit enabling ready measurement of the thrust in jet engine systems.

By the instrumentation shown there will be presented to the pilot at all times a direct reading of the gross thrust of the nozzle of the jet engine.

The only outside information presented is the information derived from the static pressure line of the aircraft and from the jet engine pressure sensing probe located forward of the after burners, and this indicator will determine gross thrust over the full operating range of the engine and under all ambient conditions and will permit use of nozzles with variable cross-sectional area.

A single instrument may be used for calculation of the thrust under all conditions of the engine operation.

It is thus apparent that many variations may be made in the system as described without departing from the essence of the invention as set forth in the appended claims.

From fixed voltage V the transducer 48–49 causes the voltage applied to potentiometer 42–43 to be proportional to the reciprocal of stagnation pressure $P_o$.

The servo motor 38 displaces the brush 42 of the potentiometer 42–43 a distance proportional to the thrust F and the voltage between brush 42 and ground 44 must hence be proportional to the thrust F divided by the stagnation pressure $P_o$.

From the fixed voltage V, the transducer 53–54 causes static pressure to be converted into a voltage at point 58 which is proportional to the static pressure.

The amplifier 30 consists of two feedback amplifiers each of which possesses the property that its output voltage O is proportional to input current I.

The output current I is the voltage applied at point 58 divided by the resistance in the high impedance transducer 61. Hence the output voltage O is proportional to ratio of static pressure $P_a$ to stagnation pressure $P_o$.

The shaping network 25 produces the required function of the static pressure $P_a$ divided by stagnation pressure $P_o$. This function has the form determined by the equation $$y = \frac{F}{A_N P_o}$$

The change in the function when passing through the velocity of sound is automatically introduced in the shaping network 25.

There will be a change of function when the speed of the gases pass through the velocity of sound and this is automatically taken care of at the network 25.

Figure 2C:
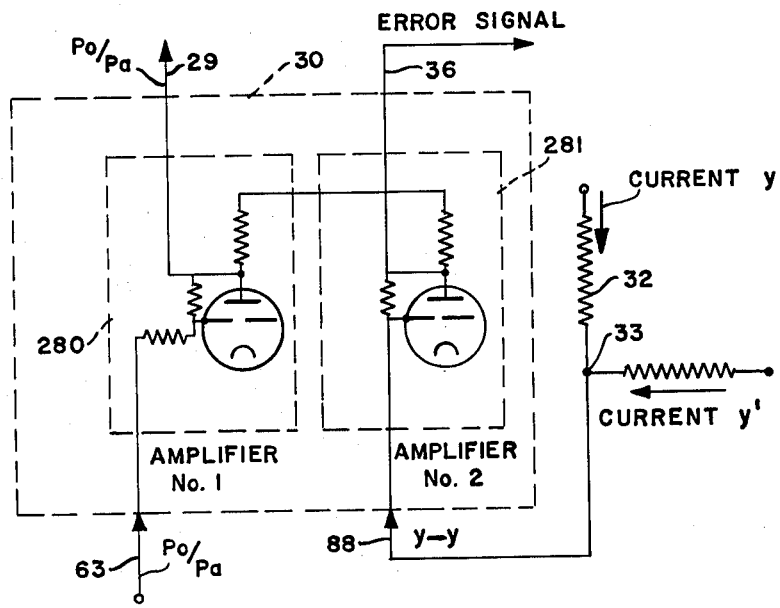
FIG. 2c is a diagrammatic layout of a typical double feedback amplifier as shown in FIG. 2.
Figure 2B:
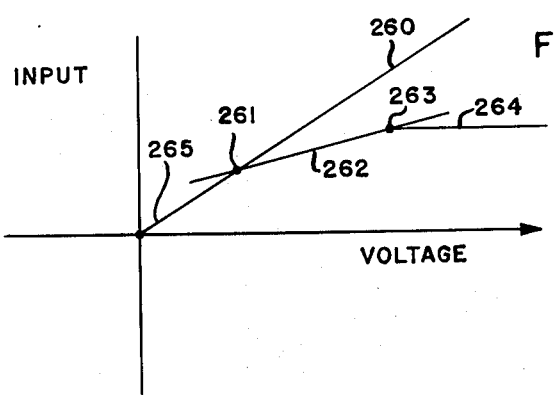
FIG. 2b is a diagrammatic showing of a curve which has resulted from the action of the shaping network of the computer unit.

Referring to FIGS. 2a and 2b, the diodes 250 and 251 automatically shape the curve 265–262–264 so as to give the function indicated at the upper right of the shaping network and there will be an automatic action at the specific position of $P_a/P_o$ which corresponds to the velocity of sound so that at the velocity of sound the slope of the shaping network will change due to the action of the diode as indicated in FIG. 2b.

In other words the form of the equation of FIG. 2b changes when the velocity of sound is reached and the shaping network will automatically take care of this change in function or equation.

This is the conventional use of the shaping network and the change in slope that takes place under the action of the diodes 261 and 263 represents a switching operation.

The current $I_2$ entering the other feedback amplifier is proportional to the sum of the currents in the input branches meeting at 33 and is hence proportional to the function $y$ of the pressure ratio minus the thrust provided by the product of stagnation pressure and nozzle area.

The output $O_2$ is proportional to input current $I_2$ and provides an error signal to operate the servo motor 38.

The servo motor 38 operates to reduce the error signal to zero and hence the input current $I_2$ is maintained essentially at zero.

Therefore the current flowing in to the branch point 33 must be equal and opposite and the thrust F therefore equals the product of $A_N P_0 y$ as required by following equation:

$$y = \frac{F}{A_N P_0} = f(X)$$

Essentially the shaping network gives a correct function of a ratio of the static to the stagnation pressure and this in combination with the servo controlled transducer-potentiometer-feedback amplifier system for multiplying the function by the nozzle area and the stagnation pressure will give a correct thrust indication.

The equations above will give an accurate measurement throughout the entire range both above and below the velocity of sound.

With the shaping network of the present invention, indicated at 25, an exact function is obtained and it will be noted that an afterburner signal is received at 28 in addition to the gas correction signal indicated at K at the upper lefthand corner of FIG. 2. This gas correction signal is transmitted through the line 27 to the shaping network 25.

In the arrangement shown in FIG. 2, $y$ is computed in the shaping network while $y'$ results when the information is passed beyond the junction point 33 and the error signal will be the difference between $y'$ and $y$ indicated upon the line 37 of FIG. 2.

$y$ will change when the pressure transducers measure any change in pressure $P_0$ or $P_a$.

$y'$ does not change if the motor 38 stands still and $y'$ requires displacement of motor 38 to result in change.

The two equations provide one which is effective when the speed of gases is above the speed of sound and the other of which is effective when they are below the speed of sound.

The afterburner signal through line 28 from the position 15 of FIG. 1 consists of electrical information from the afterburner and transmits it to the shaping network.

It will be noted that information $y$ is supplied from the shaping network 25 and $y'$ is supplied through the line 84 and the difference constituting the error signal is transmitted through the line 37 constituting the error signal.

This error signal will drive the motor, giving an indication of thrust on the dial 40.

The actuating means for the adjustable contact 81 is manual, but not shown.

The contact 49 is actuated by a bellows actuated by probe pressure (not shown). The contact 54 will be similarly actuated by an arrangement, not shown, for indicating the static pressure.

Movable contact 62 is also bellows driven by the probe pressure. The bellows have not been shown.

The summation of the values $I_1$ and $I_2$ is done in the feedback amplifier by means of the amplifier units 280 and 281 indicated in FIG. 2c.

The nulling or reduction of the error signal to zero is accomplished in the indicator 34 by rotation of the motor 38 moving the brush at the right of line 42 until this error signal is reduced to zero when the brush will stand still and the indicator 39 will also stand still.

It will be noted that $y$ is transmitted to the line 31 to the junction point 33 whereas $y'$ is transmitted to the line 84 to the junction point 31 and when $y$ and $y'$ are equal and opposite, there will be no transmission of a signal through the line 88.

This is accomplished by the nulling motion of the motor 38 until the brush on the line 42 assumes a null position on the resistance 43.

As shown in FIG. 2c the feedback amplifier 30 is a double amplifier in which $I_1$ is compared to $I_2$.

If the addition of $I_1$ and $I_2$ is zero, there will be no error signal transmitted through the line 37 and the motor 38 will not be actuated.

The friction encountered in the nozzle area is rather small and substantially constant and any variation with gas velocity may be disregarded.

It is not necessary to include this factor in the equation in FIG. 2 but whre a correction is made it may be introduced as indicated in the equation giving the gross thrust above set forth.

Having now particularly described and ascertained the nature of the invention, and in what manner the same is to be performed, what is claimed is:

1. In a thrustmeter system of the type having a tail pipe with an outlet nozzle, an afterburner in said tail pipe before said nozzle, a pressure sensing probe in said tail pipe before said afterburner and a static pressure indicator to indicate static pressure and serving to present to the pilot a direct reading of gross thrust at the nozzle having a motor to drive an indicator to indicate thrust, a computer unit including a shaping network and a double feedback amplifier producing an error signal, means to supply electrical signal information giving the ratio of static to probe pressure from the feedback amplifier to the shaping network, means to supply electrical signal information as the gas correction and from the afterburner to the shaping network, a feedback connection from the shaping network to the amplifier to supply an electrical signal giving a function of said ratio, means to supply electrical signals giving static and probe pressures to the feedback amplifier and said amplifier adding said supplied static and probe pressure signals and supplying an error signal to said motor to drive said indicator.

2. A thrustmeter system of the type having a tail pipe with an outlet nozzle, an afterburner in said tail pipe before said nozzle, a pressure sensing probe in said tail pipe before said afterburner and a static pressure indicator to indicate static pressure and serving to present to the pilot a direct reading of gross thrust at the nozzle and having a nozzle area transducer and comprising a motor driven indicator, low impedance transducers including variable bellows driven variable resistances to establish electrical signals proportional to the static and probe pressures, a high impedance transducer with an adjustable resistance to receive an electrical signal as to probe pressure from said low impedance transducers, a shaping network, a double feedback amplifier producing an error signal receiving electrical signal information proportional to the ratio of static to probe pressure from said high impedance transducer and a signal proportional to a function of the ratio of static to probe pressure from said shaping network and to receive feedback electrical signal information from said motor driven indicator and in turn supplying an error electrical signal to drive said motor and a nozzle area transducer to modify the feedback electrical signal information from said indicator supplied to said amplifier.

References Cited by the Examiner
UNITED STATES PATENTS

| | | | |
|---|---|---|---|
| 2,579,617 | 12/1951 | Schaevitz | 73—116 |
| 2,761,315 | 9/1956 | Anderson et al. | 73—180 |
| 2,866,332 | 12/1958 | Sherman | 73—116 |

OTHER REFERENCES

Text, Electron Tube Circuits, Seely (McGraw-Hill) 1950, chapters 7 and 8.

RICHARD C. QUEISSER, *Primary Examiner.*

CHARLES A. CUTTING, ROBERT L. EVANS, *Examiners.*